Oct. 31, 1961
P. W. CORBETT
3,006,499
SAFETY MEANS FOR TANK CAPS
Filed July 31, 1959
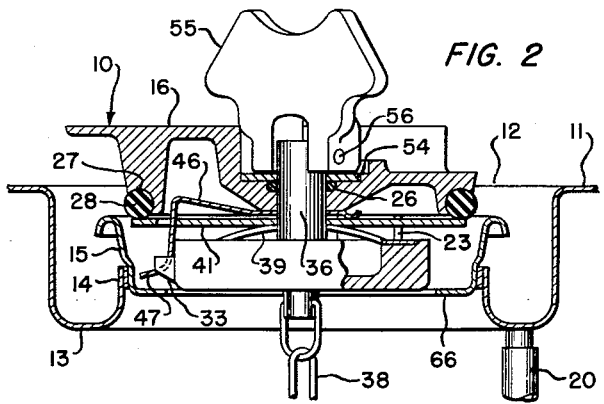
FIG. 2
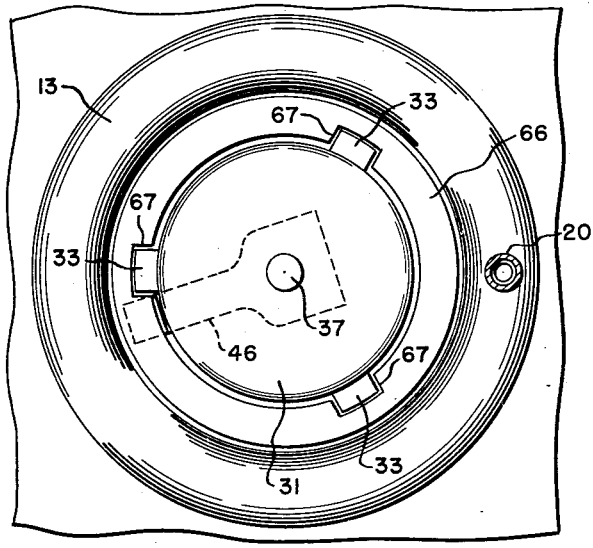
FIG. 3
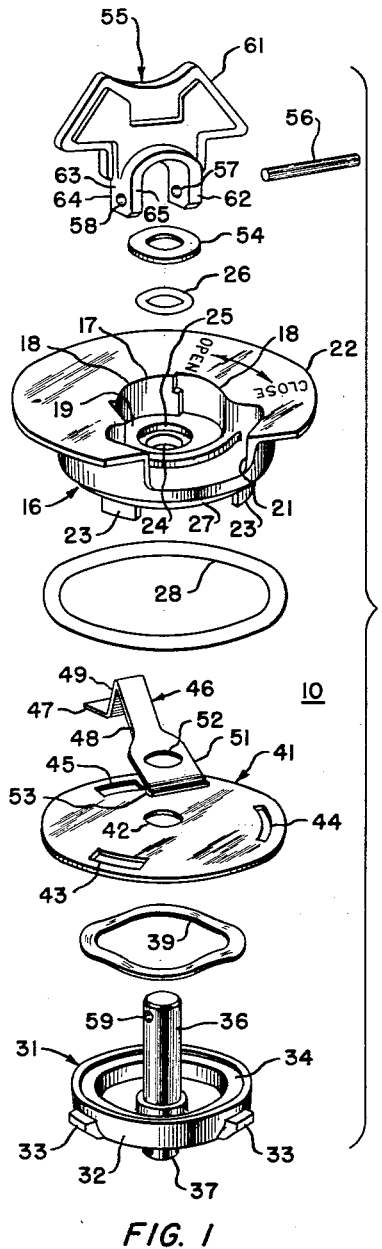
FIG. 1
FIG. 4
INVENTOR.
PHILIP W. CORBETT
BY
*Walter J. Jason*
ATTORNEY

3,006,499
SAFETY MEANS FOR TANK CAPS
Philip W. Corbett, San Diego, Calif., assignor to General Dynamics Corporation, San Diego, Calif., a corporation of Delaware
Filed July 31, 1959, Ser. No. 830,884
4 Claims. (Cl. 220—40)

The present invention relates to improvements in tank caps and has particular reference to safety means to be carried by a tank cap to assure proper locking of the cap to its support.

The necessity for providing means in connection with fuel and oil tank filler caps to prevent improper or unlocked installation thereof on their associated tank filler neck is well recognized in the aircraft field. Obviously, a loose or partially engaged cap is detrimental to the safety of the aircraft inasmuch as fuel or oil may escape to cause damage or fire.

One of the more widely used caps is constructed in such a manner as to require a projecting handle or signal flag to be rotated into the cap body in order to effect a seal with the tank filler neck. Although this feature per se would appear to be sufficient to provide visual warning of an unlocked cap, it is not completely fool-proof. The deficiency lies in the fact that the projecting handle may be rotated into the cap body prior to placement of the cap on the filler neck. Further it is possible to place the cap on the filler neck with the handle rotated into the cap body without engagement of the lugs of the cap with the internal flange element of the filler neck. In either case the signal flag handle would falsely indicate a locked or properly engaged cap. Since fuel tanks in aircraft are often pressurized or build up pressure, the necessity for positive locking of the cap before flight will be readily apparent.

Accordingly an object of the present invention lies in the provision of safety means to prevent the signal element of a tank cap from being moved to closed position prior to proper engagement of the cap with its associated tank filler neck structure.

Another object of this invention is to provide a tank cap having novel means to assure that it is properly locked to its support.

A further object of this invention is to provide a tank cap having novel safety means to prevent premature movement of its signal flag handle to closed position and which will not interfere with or obstruct the normal functioning of the handle.

Other objects and features of the present invention will be readily apparent to those skilled in the art from the following specification and appended drawings wherein is illustrated a preferred form of the invention, and in which:

FIGURE 1 is an exploded perspective view of the tank cap of the present invention.

FIGURE 2 is a transverse sectional view showing the tank cap about to be positioned in its associated tank filler neck with the signal flag handle in extended position.

FIGURE 3 is a bottom plan view of FIGURE 2.

FIGURE 4 is a view illustrated in the same plane as FIGURE 2 showing the tank cap in engaged position with the filler neck structure of the tank and the handle rotated into the body of the cap.

Referring now with particularity to the drawings a tank cap in accordance with the present invention is generally indicated in its entirety by the numeral 10. Tank cap 10, as shown in FIGURE 2, is associated with a fuel cell or tank having a wall 11 with a filler opening 12 formed therein. Wall 11 may be formed of sheet metal and at the opening 12 is suitably bent into the shape of an annular trough or overflow scupper 13. Secured, as by welding, to flange 14 of trough 13 is a filler neck adapter ring 15 adapted to receive tank cap 10. A drain line 20 communicates with trough 13 to discharge spilled fuel or oil to the exterior of the tank.

Tank cap 10 comprises a body member 16 having a handle cavity or well 17 defined by curved walls 18 and a base 19 and communicating to the exterior through an opening 21 at the side of body member 16. Body member 16 includes an outwardly projecting flange portion 22 in surrounding relation to cavity 17. A pair of lugs 23 depend from the lower surface of body member 16 adjacent the periphery and are spaced approximately 120° apart. Base 19 is bored at 24 through to the exterior of the lower surface of body member 16. Surrounding, and coaxial with, bore 24 is a sealing ring groove 25 formed in base 19 which receives a usual O resilient sealing ring 26. Formed on the bottom surface of body member 16 is a circumferential groove 27 which receives a larger O resilient sealing ring 28.

Associated with body member 16 is a locking member 31 which comprises a generally cup-shaped annular base portion 32 having three radially projecting lugs 33, spaced 120° apart, extending outwardly therefrom. Base portion 32 is recessed to provide a surface 34 and is also provided centrally with an upwardly projecting, integral cylindrical shaft 36. A downwardly projecting portion 37 extends from the bottom surface of base portion 32 and may serve to attach a chain 38 to carry a usual dipstick (not shown). A washer-type spring 39 having a wave-like conformation rests upon recessed surface 34 to be sandwiched between an annular plate 41 and base portion 32.

Annular plate 41 is centrally bored at 42 for the passage of shaft 36. Three equally spaced apart annularly arranged slotted openings 43, 44 and 45 are formed in annular plate 41, two of which openings, 43 and 44, receive the lugs 23 of body member 16 to prevent rotation of annular plate 41 relative to body member 16. The third slotted opening 45 receives one end of a spring element 46.

Spring element 46 may be formed from any suitable spring material such as spring steel and as shown is elongated and in side view is generally Z-shaped. Spring element 46 comprises a short leg or tab 47 and a longer leg 48 joined by a vertical portion 49. Longer leg 48 includes a widened portion 51 having a circular opening 52 therethrough for the passage of shaft 36 of locking member 31. The outer end of longer leg 48 is bent into a transverse trough-like configuration 53 which bears against the upper surface of annular plate 41. As shown in FIGURE 2, leg 48 inclines upwardly from its trough-like end 53 to the interconnecting vertical portion 49. The shorter leg 47 passes through slotted opening 45 to lie disposed on the opposite side of annular plate 41 and interconnecting portion 49 is adapted to ride within slotted opening 45.

Shaft 36 of locking member 31 extends into cavity 17 of body member 16, passing through bore 24 of base 19. O ring 26 which rests in groove 25 fits tightly about shaft 36 to prevent seepage of fuel or oil from the fuel tank and around shaft 36. A washer 54 is positioned over O ring 26 to maintain it within its groove 25.

A signal flag handle 55 is pivotally connected to the upper end of shaft 36 by a pin 56 passing through openings 57 and 58 of handle 55 and aligned opening 59 of shaft 36.

Signal flag handle 55 comprises a generally trapezoidal shaped portion 61 from which downwardly depends a pair of spaced apart leg portions 62 and 63 which are provided with the openings 57 and 58 respectively. Openings 57 and 58 are located in leg portions 62 and 63 transversely off-set from the center. Accordingly, openings 57 and 58 are located closer to rear side surfaces 64 of leg portions 62 and 63 than to forward side surfaces 65 thereof. Signal flag handle 55 when pivoted upon pin 56 to lie flat within cavity 17 will cause an upward pulling force to be applied to shaft 36. In this movement, the lower ends of leg portions 62 and 63 bear upon washer 54 to provide upward pressure on pin 56 and as handle 55 is moved into cavity 17 the upward pressure exerted on pin 56 will lift shaft 36 to carry locking member 31 into locked position.

FIGURE 2 illustrates the tank cap 10 being lowered into filler opening 12 for closure thereof. When tank cap 10 is placed into filler opening 12 its signal flag handle 55 will be in its raised extended position as shown whereby locking member 31 will be held spaced from annular plate 41 by the action of spring 39. While in this open position flag handle 55 is prevented from being rotated from its open to its closed position by shorter leg 47 of spring element 46. This is achieved by reason of the disposition of shorter leg 47 in an obstructing position relative to one of the lugs 33 of the locking member 31.

Tank cap 10 is moved inwardly into filler opening 12 until lugs 33 of locking member 31 strike an inwardly turned flange 66 of filler neck adapter or supporting ring 15. Tank cap 10 is then bodily turned by means of handle 55 until lugs 33 align with openings or slots 67 in flange 66. Upon alignment, tap cap 10 is pressed downwardly to pass lugs 33 through slots 67 beneath flange 66. Concurrently with the passage of lugs 33 through slots 67, shorter leg 47 of spring element 46 engages flange 66 to deflect spring element 46 upwardly into the position shown in FIGURE 4 wherein shorter leg 47 will be moved from its obstructing position relative to its associated lug 33. With shorter leg 47 in its upward displaced position handle 55 may be rotated in a clockwise direction to its closed position thereby rotating locking member 31 to carry lugs 33 thereof beneath flange 66. Thereafter, handle 55 may be rotated on its pivot pin 56 and be fitted within the portion of cavity 17 having an outline conforming to the shape of handle 55. When moved into the cavity 17, handle 55 acts to apply a pulling force on shaft 36 of locking member 31 as explained above. Lugs 33 will be pressed tightly against the bottom of flange 66 and body member 16 and locking member 31 will be drawn together to compress spring 39 and to force the larger O sealing ring 28 into tight sealing contact with the seat afforded by adapter ring 15. With handle 55 down and in concealed position within cavity 17 an observer will know that the tank cap 10 is in proper and locked condition. To release tank cap 10 it is necessary only to operate the handle 55 in reverse direction and reverse the steps above described.

While certain preferred embodiments of the invention have been specifically disclosed it is understood that the invention is not limited thereto as many variations will be readily apparent to those skilled in the art and the invention is to be given its broadest possible interpretation within the terms of the following claims.

What I claim is:

1. A tank cap assembly for a receptacle having a filler opening and a supporting ring therearound, said cap assembly comprising a body member, a locking member rotatably and rectilinearly mounted on said body member, an actuating handle connected to said locking member for rotating said locking member into position for rectilinear movement by said actuating handle into clamped engagement with said supporting ring, a projecting lug on said locking member, a spring member, means for fixedly locating said spring member relative to said body member, said spring member having a portion thereof normally positioned for engagement by said projecting lug to prevent rotative movement of said locking member by said actuating handle.

2. A tank cap assembly for a receptive having a filler opening and a supporting ring therearound, said cap assembly comprising a body member, a locking member rotatably and rectilinearly mounted on said body member, an actuating handle connected to said locking member for rotating said locking member into position for rectilinear movement by said actuating handle into clamped engagement with said supporting ring, a projecting lug on said locking member, a spring member, an annular plate member fixedly mounted relative to said body member, said spring member being fixedly located relative to said body member and being of generally Z shape configuration with one leg disposed on one side of said annular plate and a second leg located on the opposite side of said plate, said second leg normally positioned for engagement by said projecting lug to prevent rotative movement of said locking member by said actuating handle.

3. A tank cap assembly for a receptacle having a filler opening and a supporting ring therearound, said cap assembly comprising a body member, a locking member, a cylindrical shaft carried by said locking member and projecting through a bore in said body member, an actuating handle pivotally connected to the projecting end of said shaft for rotatively and rectilinearly mounting said locking member to said body member, said actuating handle adapted to rotate said locking member into position for rectilinear movement into clamped engagement with said supporting ring, a projecting lug on said locking member, a spring member, and an annular plate member fixedly mounted relative to said body member, said spring member being of generally Z shape configuration with one leg disposed on one side of said annular plate and having an opening for passage therethrough of said shaft to fixedly locate said spring member relative to said body member, a second leg of said spring member being located on the opposite side of said plate, said second leg normally positioned for engagement by said projecting lug to prevent rotative movement of said locking member by said actuating handle.

4. A tank cap assembly for a receptacle having a filler opening and a supporting ring therearound, said cap assembly comprising a body member, a locking member rotatably and rectilinearly mounted on said body member, an actuating handle pivotally connected to said locking member for rotating said locking member into position for rectilinear movement by said actuating handle into clamped engagement with said supporting ring, said body member having a cavity for receiving and concealing said actuating handle after said locking member has been actuated by said actuating handle into clamped engagement with said supporting ring, a projecting lug on said locking member, a spring member, means for fixedly locating said spring member relative to said body member, said spring member having a portion thereof normally positioned for engagement by said projecting lug to prevent rotative movement of said locking member by said actuating handle.

References Cited in the file of this patent

UNITED STATES PATENTS

| | | |
|---|---|---|
| 2,720,999 | Gamundi | Oct. 18, 1955 |
| 2,740,548 | Schultz | Apr. 3, 1956 |